Figure 1:
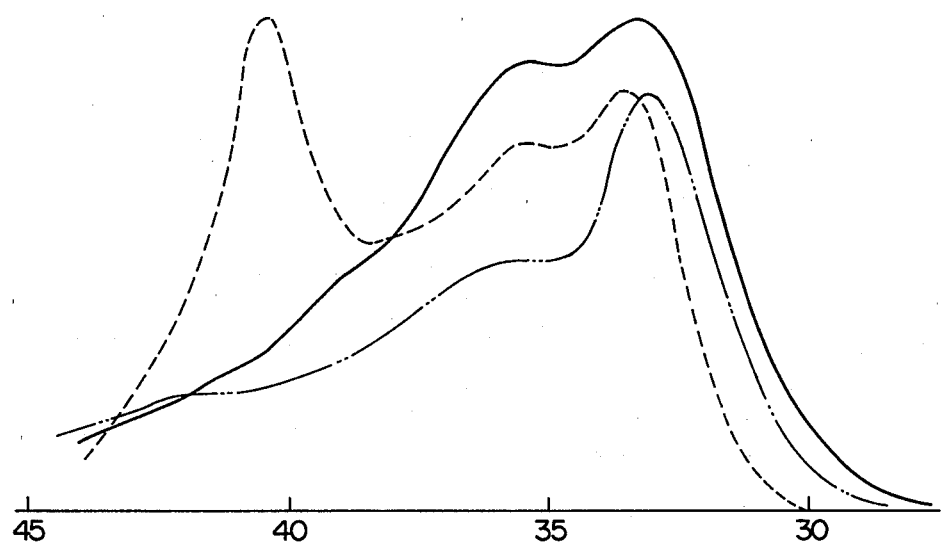

United States Patent [19]
Okoshi et al.

[11] 4,391,640
[45] Jul. 5, 1983

[54] PROCESS FOR PRODUCING OIL-MODIFIED AND ROSIN-MODIFIED PHENOLIC RESIN FOR PRINTING INKS

[75] Inventors: Noboru Okoshi; Kin-ichi Kudo; Shoichi Shimoyama, all of Chiba, Japan

[73] Assignee: Dainippon Ink & Chemicals, Inc., Tokyo, Japan

[21] Appl. No.: 270,021

[22] Filed: Jun. 3, 1981

[30] Foreign Application Priority Data

Jun. 5, 1980 [JP] Japan .................. 55-74920

[51] Int. Cl.$^3$ .................. C09D 11/06; C09D 11/08
[52] U.S. Cl. .................. 106/29; 106/30; 260/DIG. 38; 525/54.4; 525/54.5; 527/602; 527/603
[58] Field of Search ....... 260/19 R, 19 UA, DIG. 38, 260/25; 106/29, 30; 527/602, 603; 525/54.4, 54.5

[56] References Cited

U.S. PATENT DOCUMENTS

| | | | |
|---|---|---|---|
| 1,947,415 | 2/1934 | Heck | 527/603 |
| 2,124,285 | 7/1938 | Bucherer | 527/602 |
| 2,413,412 | 12/1946 | Mazzucchelli | 260/19 R |
| 3,806,481 | 4/1974 | Blatt | 260/25 |
| 3,896,064 | 7/1975 | Koishi et al. | 106/30 |
| 3,947,393 | 3/1976 | Sato et al. | 260/19 R |
| 4,002,585 | 1/1977 | Oishi et al. | 260/25 |
| 4,183,833 | 1/1980 | Miyaguchi et al. | 260/23.7 C |
| 4,189,410 | 2/1980 | Laurito | 260/23.7 C |
| 4,205,145 | 5/1980 | Tsuchiya et al. | 260/DIG. 38 |
| 4,256,619 | 3/1981 | Miyaguchi et al. | 260/23.7 C |

FOREIGN PATENT DOCUMENTS

| | | | |
|---|---|---|---|
| 370946 | 4/1932 | United Kingdom | 527/603 |
| 586061 | 3/1947 | United Kingdom | 527/602 |

Primary Examiner—Ronald W. Griffin
Attorney, Agent, or Firm—Sherman & Shalloway

[57] ABSTRACT

A process for producing an animal or vegetable oil-modified and rosin-modified phenolic resin for printing inks, which comprises:

[I] reacting (a) a resol-type phenol/formaldehyde initial condensation product, (b) an animal or vegetable oil having an iodine value of 100 to 210 or containing a hydroxyl group, (c) a rosin and (d) an alchohol, and if required, (e) an acid or (f) a hydrocarbon resin; or

[II] reacting the condensation product (a) and the animal or vegetable oil (b) with a rosin ester obtained by the reaction of the rosin (c) and the alcohol (d) and if required, the acid (e) or the hydrocarbon resin (f) in advance.

18 Claims, 2 Drawing Figures

PROCESS FOR PRODUCING OIL-MODIFIED AND ROSIN-MODIFIED PHENOLIC RESIN FOR PRINTING INKS

This invention relates to a process for producing an oil-modified and rosin-modified phenolic resin having excellent properties as a vehicle for offset printing inks.

Rosin-modified phenolic resins have gained most widespread use as vehicles for offset printing inks. With the development of the printing arts, the speeds of printing have become increasingly high, and requirements for various ink properties such as gloss and drying property (so-called "set") have been increasingly rigorous. Various types of resins have been developed in order to meet these requirements.

For example, in order to increase solubility in aliphatic solvents, the use of various hydrocarbon resin-modified rosin-modified phenolic resins (Japanese Patent Publication Nos. 27492/1971 and 38113/1978) or the use of dicyclopentadiene-modified rosin-modified phenolic resins (Japanese Laid-Open Patent Publication No. 125494/1978) has been proposed. Furthermore, a method comprising utilizing $\alpha,\beta$-unsaturated polybasic acids (Japanese Patent Publication No. 11354/1971) and a method using hardened rosin (Japanese Patent Publication No. 40669/1970) have been reported in order to improve the properties of printing inks. Although these prior art techniques give satisfactory results in the individual properties required, they have still been unable to provide an excellent balance of gloss and set which is most important in printing ink vehicles. In other words, a vehicle having good gloss is slow setting, and conversely, a vehicle which is fast setting has poor gloss.

The present inventors have made detailed investigations about various factors which affect gloss and set of inks in order to overcome the difficulties of the prior art, and found that a printing ink which has been solidified upon transfer to an object to be printed has better gloss when the amount of the vehicle is larger than that of the pigment, and it has a faster set when the softening point of the resin is higher. It has further been found that an oil-modified and rosin-modified phenolic resin can satisfactorily have both excellent gloss and fast set.

Thus, according to this invention, there is provided a process for producing an oil-modified rosin-modified phenolic resin having an acid value of not more than 30 and a softening point of at least 70° C., preferably 100 to 150° C., suitable for use in printing inks, which comprises (I) reacting (a) a resol-type phenol/formaldehyde initial condensation product [to be abbreviated "a condensate (a)" hereinbelow], (b) an animal or vegetable oil having an iodine value of 100 to 210 or containing a hydroxyl group [to be referred to as "an oil component (b)"], (c) a rosin and a (d) an alcohol and if desired, (e) an acid or (f) a hydrocarbon resin, or [II] reacting the condensate (a) and the oil component (b) with a rosin ester obtained by reacting the rosin (c) or a mixture of it and the acid (e) with the alcohol (d) or a mixture of it and the hydrocarbon resin (f) in advance.

The condensate (a) is a product obtained by reacting a phenol such as phenol, cresol, p-tert-butylphenol, p-octylphenol, p-nonylphenol or bisphenol A with a formaldehyde-yielding substance such as formalin or paraformaldehyde in the presence of an alkaline catalyst, thereafter neutralizing the reaction product with an acid, and if desired, washing the product with water.

Usually, this product is a mixture of a compound of the formula

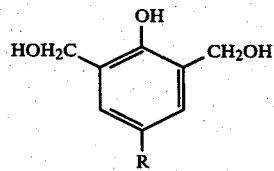

wherein
R represents a hydrogen atom or an alkyl group,
as a main ingredient and a compound of the formula

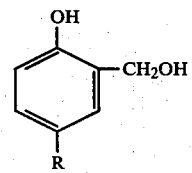

wherein
R is as defined above,
and/or a compound of the formula

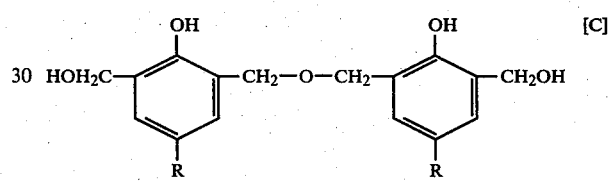

wherein
R is as defined above,
as a subsidiary ingredient.

The amount of the condensate (a) used is 10 to 35 parts by weight, preferably 20 to 30 parts by weight, per 100 parts by weight of the entire resin-forming components. If the amount of the condensate (a) exceeds 35 parts by weight, the amount of a self-condensation product of the condensate (a) itself increases. Hence, when it is used in a printing ink, the viscosity of the ink becomes exceedingly high. If the amount is less than 10 parts by weight, the resulting resin has a low molecular weight and the reactivity of the condensate (a) with the oil component (b) is reduced. Consequently, the viscosity of the ink becomes lower.

The mole ratio of the formaldehyde-yielding substance to the phenol is suitably from 1.0 to 2.5, preferably from 1.5 to 2.0.

Typical examples of the oil component (b) are animal or vegetable oils having an iodine value of 100 to 210, such as tall oil, cotton seed oil, soybean oil, safflower oil, dehydrated castor oil, linseed oil, tung oil, cattlefish oil and sardine oil or animal or vegetable oils containing a hydroxyl group such as castor oil. Fatty acids of these and stand oils generally used in preparing varnishes, such as a di- to tetra-mer of linseed oil or polymers thereof, can also be used.

The oil component (b) may be used singly, or if required, two or more such oil components (b) may be used in combination. The suitable amount of the component (b) is 5 to 40 parts by weight, preferably 5 to 30 parts by weight, per 100 parts by weight of the entire oil-modified resin-forming components. If the component (b) is used in an amount of more than 40 parts by weight, the amount of the unreacted oil component in the resin increases relatively, and the resulting resin cannot provide an ink having a good balance of gloss and set. If the amount of the component (b) is less than 5 parts by weight, the effect of modification by the oil component (b) is very much reduced.

The component (b) should have an iodine value of at least 100. If the iodine value is less than 100, the reactivity of the component (b) with the resol-type phenol/formaldehyde initial condensation product (a) is reduced, and consequently, a good balance of gloss and set contemplated in this invention cannot be obtained. The iodine value may be considerably high, but animal and vegetable oils now commercially available have an iodine value of 210 as the highest.

The rosin (c) typically includes gum rosin, wood rosin, tall oil rosin, hardened rosin, etc.

The alcohol (d) typically includes polyhydric alcohols such as ethylene glycol, diethylene glycol, propylene glycol, dipropylene glycol, butylene glycol, neopentyl glycol, hexanediol, hexanetriol, glycerol, trimethylolethane, trimethylolpropane and pentaerythritol; and higher monohydric alcohols such as hexyl alcohol, nonyl alcohol or octyl alcohol. Trihydric or higher alcohols are especially preferred.

Typical examples of the acid (e) are monobasic or polybasic acids such as benzoic acid, p-t-butylbenzoic acid, succinic acid, adipic acid, maleic acid (anhydride), itaconic acid (anhydride), phthalic acid (anhydride) and trimellitic acid. Usually, the acid (e) is not essential, but is is useful when it is desired to obtain resins having a high molecular weight and a high softening point.

The rosin ester mentioned above is obtained by esterifying the rosin (c) and the alcohol (d) in a customary manner optionally in the presence of the acid (e) or the hydrocarbon resin (f).

The amount of the alcohol (d) used is such that the equivalent ratio of the hydroxyl groups to the total carboxylic acid [i.e., the rosin (c) itself or the total amount of the rosin (c) and the acid (e)] is from 0.7 to 1.3, preferably 0.9 to 1.2. If the equivalent ratio exceeds 1.3, the hydroxyl groups become excessive with the result that the resulting resin becomes hydrophilic and is susceptible to emulsification by dampening water. Consequently, the resulting resin does not serve for practical purposes. If the equivalent ratio is less than 0.7, the acid becomes excessive and the molecular weight of the resin becomes low so that the softening point of the resin becomes too low.

The hydrocarbon resin (f) includes aliphatic, aromatic and alicyclic resins having a number average molecular weight of generally about 500 to about 5,000 and a softening point of at least 70° C., and the derivatives thereof, which are obtained, for example, by polymerizing isoprene, cyclopentadiene or dicyclopentadiene which is a $C_5$ fraction obtained as a by-product in the thermal cracking of petroleum naphtha, or a styrene derivative or indene which is a $C_9$ fraction obtained in the thermal cracking of petroleum naphtha. Generally, the use of the hydrocarbon resin (f) is effective in increasing solubility in solvents and emulsification resistance in preparing varnishes, but frequently tends to be an adverse factor on the gloss of ink. The suitable amount of the component (f) is not more than 30 parts by weight per 100 parts by weight of the entire resin-forming components.

In performing the process of this invention, the condensate (a), the oil component (b), the rosin (c) and the alcohol (d) and if desired the acid (e) or the hydrocarbon resin (f) are reacted at a temperature of 200° to 280° C.; or the rosin (c) and the alcohol (d) and if desired the acid (e) or the hydrocarbon resin (f) are first reacted at a temperature of 200° to 280° C. to form a rosin ester, and then the rosin ester is reacted with the condensate (a) and the oil component (b) at a temperature of 200° to 280° C. In a preferred embodiment of the present invention, the condensate (a) is continuously added dropwise or intermittently added at 120° to 180° C. over 1 to 5 hours in the co-presence of the rosin (c) and the oil component (b) and if desired the acid (e) or the hydrocarbon resin (f) and they are reacted, after which the alcohol (d) is added and the esterification reaction is carried out at 200° to 280° C. The preference to this embodiment is attributed to the fact that by performing the reaction while continuously adding the condensate (a) dropwise or intermittently adding it, the self-condensation of the condensate (a) can be inhibited in contrast to the case of reacting all of the condensate (a) at one time.

The oil-modified and rosin-modified phenolic resin obtained by the process of this invention preferably has a number average molecular weight of about 500 to about 5,000 calculated in terms of polystyrene. Basically, it may be regarded as a product of the simultaneous reaction of the semidrying or drying animal or vegetable oil or its fatty acid (b), the resol-type phenol/formaldehyde initial condensation product and the rosin ester, which is formed by the reaction of the animal or vegetable oil or its fatty acid (b) with both the phenol/formaldehyde initial condensation product (a) and the rosin ester.

In contrast, a product obtained by reacting a rosin-modified phenolic resin with a stand oil at 220° to 250° C. for 1 to 2 hours is used in conventional ink varnishes. The rosin-modified phenolic resin, however, has low reactivity. In the preparation of a rosin-modified phenolic resin by the reaction of a resol-type addition-condensation product with a rosin, the active groups such as a methylol or methylene ether group of the resol-type addition-condensation product and the active groups such as a conjugated double bond of the rosin are consumed almost completely by the formation of a coumarone ring or by self-condensation in the course of the reaction. Hence, the rosin-modified phenolic resin obtained scarcely contain these active groups. Even when such a rosin-modified phenolic resin and stand oil are heated together, reaction scarcely takes place between them, and the resulting varnish is merely a simple physical mixture of both. This fact is clearly substantiated by the results of measurement of the molecular weight distribution of the product by gel permeation chromatography (GPC). One example is shown in the attached drawings.

Figure 2:
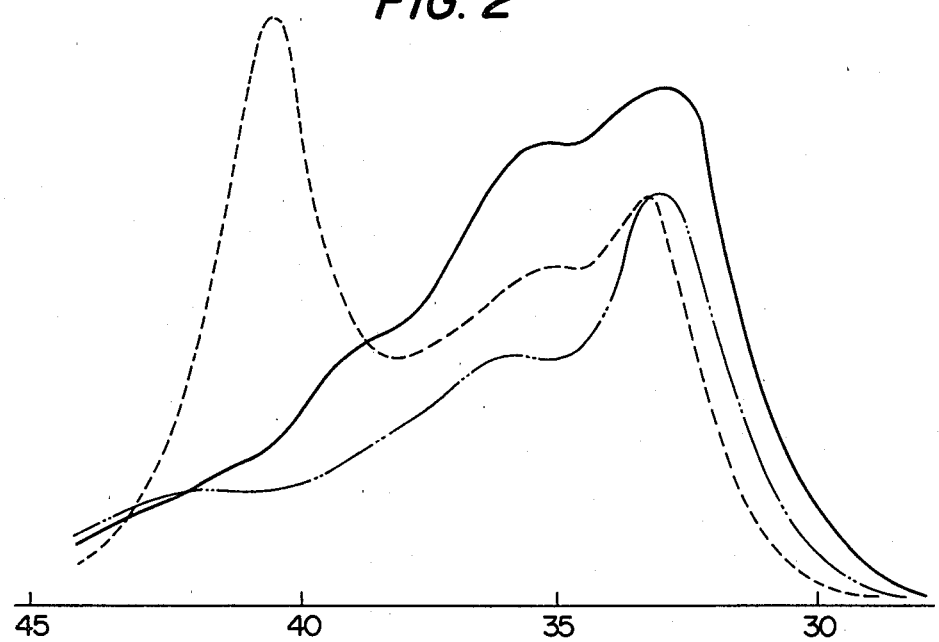

In the attached drawings, FIGS. 1 and 2 are gel permeation chromatographic charts showing the molecular weight distribution of the resin obtained by the process of this invention in comparison with that of a conventional resin. FIG. 1 shows the case where the amount of the oil component (linseed oil) is 30%, and FIG. 2, the case wherein the amount of the oil component (linseed oil) is 40%. The solid lines in these figures refer to the resin of this invention (oil-modified and rosin-modified phenolic resin); the two-dot chain line, to a rosin-modified phenolic resin; and the dotted line, to a product obtained by cooking a rosin-modified phenolic resin and an oil at 250° C. for 6 hours.

The measurement by GPC was conducted under the following conditions.

Instrument: Model 200 (a product of Waters Associate Co. of U.S.A.)
Column: 4 feet in length and ⅜ inch in diameter
Filler: "μ-Styragel" (Waters Associate Co., U.S.A.)

FIGS. 1 and 2 show that the product obtained by cooking under very severe conditions (250° C., 6 hours) (shown by the dotted lines) still contained a free oil (linseed oil), but that the products of the invention (shown by the solid lines) scarcely contain an appreciable amount of a free oil, and the distribution has shifted to a high-molecular-weight region.

Accordingly, a conventional ink based on the mixture of rosin-modified phenolic resin and stand oil as a varnish has the defect that after printing, the free oil readily penetrates through the paper, and consequently, the set of the ink is fast but its gloss tends to be low.

This defect can be eliminated by introducing an oil component into a rosin-modified phenolic resin by a chemical bond. Since the resin obtained by the process of this invention scarcely contains the unreacted oil, an ink containing such a resin as a vehicle gives a printed matter of very good gloss with reduced penetration of the vehicle in the paper. Moreover, by dint of the cross-linking effect as a result of the oxidative polymerization of the oil, even a resin having a low softening point gives a fast set and provides an ink film having excellent abrasion resistance.

Furthermore, the market improvement of the wettability to a pigment of the resin obtained by the process of this invention, presumably because the oil is chemically combined with the resin and is present therein uniformly, is considered to be another great factor which is conducive to this excellent gloss.

It is surprising that the resin has a very good behavior of emulsification by dampening water (namely, is difficult of emulsification by the dampening water), and the stability of the resulting ink on the printing press is greatly increased.

The oil-modified and rosin-modified phenolic resin of this invention can be used as a vehicle of printing inks in the same way as rosin-modified phenolic resins. As a matter of course, it does not require cooking with the oil component because the oil has been introduced into it by a chemical bonding. In other words, the resin of this invention can be directly dissolved in a solvent to form an ink, or it can be formed into an ink by adding small amounts of an oil such as linseed oil or another hard resin, etc. In particular, when such a hard resin as a rosin-modified phenolic resin or the hydrocarbon resin (f) is to be belended, an animal or vegetable oil-modified and rosin-modified phenolic resin having an oil length of as large as 70% can also be used.

Conventional phenolic varnishes obtained by cooking resol-type phenolic resins and animal or vegetable oils at 150° to 250° C. in a known conventional manner are useful by themselves as rust-proofing paints, etc. But for use as printing ink varnishes, they give poor gloss and do not have a suitable emulsification behavior with respect to dampening water, leading to solidification of the ink. Hence, the printing stability of the ink becomes poor. Furthermore, a conventional varnish obtained by cooking a rosin-modified maleic resin and an animal or vegetable oil at an elevated temperature has good gloss but suffers from the defect that it has low resistance to dampening water. A varnish obtained by cooking a rosin-modified phenolic resin and an animal or vegetable oil is now currently used predominantly as a printing ink varnish. It has been developed in a form useful as a printing ink varnish in which the advantages and defects of the two prior art varnishes set off each other.

In view of the this state of art, one might think that if the varnish-forming methods used in preparing the phenolic varnish and the rosin-modified maleic varnish are carried out together, the same resin as that obtained by the process of this invention would be able to be obtained with equal simplicity. This never happens as stated hereinabove. The technique currently employed is to obtain a printing ink varnish by cooking the rosin-modified phenolic resin and an oil, and this technique has not been modified so far. This fact clearly demonstrates that the resin in accordance with this invention can never be obtained otherwise. In fact, for the following two reasons it is inconvenient to mix a resol-type initial condensation product having a softening point of more than 100° C. and having a high degree of condensation and a rosin ester with an oil, and react the three. Firstly, it is difficult to inhibit the self-condensation of the resol-type initial condensation product in the melting step. Should the self-condensation be able to be inhibited by some technique, the phenolic resin having such a high degree of condensation has too high a viscosity to be suitably used in ink varnishes. Secondly, it is difficult to impart properties required for printing suitability with respect to dampening water to the resulting resin, presumably because in the resulting resin, the phenolic resin and the rosin ester component are present in the form of blocks.

As stated hereinabove, the oil-modified and rosin-modified phenolic resin for printing inks obtained by the process of this invention can provide a printing ink with both high gloss and fast set which have not been able to be attained by any means previously proposed.

The following examples illustrate the present invention more specifically. All parts in these examples are by weight unless otherwise specified.

EXAMPLE 1

A 2-liter four-necked flask equipped with a stirrer, a thermometer, a dropping funnel and a refluxing device was charged with 500 g of rosin and 100 g of linseed oil, and they were heated to 160° C. Then, while maintaining the same temperature, 250 g (as solids) of a resol-type p-octylphenol/formaldehyde initial condensation product was added dropwise over 2 hours from the dropping funnel, and after the addition, the mixture was maintained at the same temperature for 1 hour. Furthermore, 50 g of glycerol was added. The mixture was heated to 250° C. over 4 hours, and then maintained at 250° to 260° C. for 8 hours to perform esterification reaction while removing water of condensation. The resulting resin had an acid value of 20 and a softening point of 126° C.

EXAMPLE 2

A 2-liter four-necked flask equipped with a stirrer, a thermometer, a dropping funnel and a refluxing device was charge with 500 g of rosin and 200 g of linseed oil, and they were heated to 160° C. Then, 300 g (as solids) of a resol-type p-octylphenol/formaldehyde initial condensation product was added dropwise over 2 hours from the dropping funnel, and after the addition, the mixture was maintained at the same temperature of 1 hour. Furthermore, 55 g of pentaerythritol was added. The mixture was heated to 250° C. over 4 hours and then maintained at 250° to 260° C. for 8 hours to perform esterification reaction while removing water of condensation. The resulting resin had an acid value of 16 and a softening point of 94° C.

EXAMPLE 3

A 2-liter four-necked flask equipped with a stirrer, a thermometer, a dropping funnel and a refluxing device was charged with 500 g of rosin and 50 g of dehydrated castor oil, and they were heated to 160° C. Then, while maintaining the same temperature, 250 g (as solids) of a resol-type p-octylphenol/formaldehyde initial condensation product was added dropwise over 2 hours, and after the addition, the mixture was maintained at the same temperature for 1 hour. Furthermore, 50 g of glycerol was added. The mixture was heated to 250° C. over 4 hours, and then maintained at 250 to 260° C. for 8 hours to perform esterification reaction while removing water of condensation. The resulting resin had and acid value of 22 and a softening point of 146° C.

EXAMPLE 4

Castor oil (200 g) was added to 500 g of rosin, and the mixture was heated to 160° C. While maintaining the same temperature, 300 g (as solids) of a resol-type p-tertiary butylphenol/formaldehyde initial condensation product was added dropwise over 2 hours from the dropping funnel, and after the addition, the mixture was maintained at the same temperature for 1 hour. Furthermore, 50 g of glycerol was added. The mixture was heated to 250° C., and maintained at 250° to 260° C. for 8 hours to perform esterification reaction while removing water of condensation. The resulting resin has an acid value of 16 and a softening point of 110° C.

COMPARATIVE EXAMPLE 1

A 2-liter four-necked flask equipped with a strirrer, a thermometer, a dropping funnel and a refluxing device was charged with 500 g of rosin, and it was heated to 160° C. While maintaining the same temperature, 250 g (solids) of a resol-type p-octylphenol/formaldehyde initial condensation product was added dropwise over 2 hours from the dropping funnel, and after the addition, the mixture was maintained at the same temperature for 1 hour. Then, 50 g of glycerol was added. The mixture was heated to 250° C. over 4 hours, and maintained at 250° to 260° C. for 12 hours to perform esterification reaction while removing water of condensation. The resin had an acid value of 20 and a softening point of 162° C.

COMPARATIVE EXAMPLE 2

A 2-liter four-necked flask equipped with a stirrer, a thermometer, a dropping funnel and a refluxing device was charged with 500 g of rosin. While maintaining the same temperature, 300 g (as solids) of a resol-type p-tert-butylphenol/formaldehyde initial condensation product was added dropwise over 2 hours from the dropping funnel, and after the addition, the mixture was maintained at the same temperature for 1 hour. Then, 50 g of glycerol was added. The mixture was heated to 250° C. over 4 hours, and maintained at 250° to 260° C. for 12 hours to perform esterification reaction while removing water of condensation. The resulting resin had an acid value of 22 and a softening point of 172° C.

The various properties of the resins obtained in Examples 1 to 4 and Comparative Examples 1 and 2 were tested comparatively. The results are shown in Table 1.

TABLE 1

|  | Example | | | | Comparative Example | |
|---|---|---|---|---|---|---|
|  | 1 | 2 | 3 | 4 | 1 | 2 |
| Stability of the ink | 0.5 | 0.4 | 0.5 | 0.3 | 1.5 | 1.8 |
| Gloss | 77 | 79 | 78 | 79 | 67 | 62 |
| Set time | 10 | 10 | 10 | 10 | 15 | 10 |

Varnishes and inks were prepared by the following methods, and the properties of the resins were tested and evaluated by the following methods.

Preparation of a varnish

The rosin-modified phenolic resin in each of the Comparative Examples was cooked at 250° C. for 1 hour in accordance with the following conventional formulation, and then dissolved in a solvent.

Rosin-modified phenolic resin—45 parts
Linseed oil—25 parts
"Nisseki No. 5 Solvent" (solvent)—30 parts
Aluminum chelate—1 part The oil-modified and rosin-modified phenolic resin in each of the Examples was blended in accordance with the recipes shown in Table 2, and the amount of the oil component was made equal to that in the above Comparative Examples. No cooking was required, however, in the Examples, and the ingredients were only dissolved in the solvent.

Then, to each of the solutions in the Examples and Comparative Examples 1 part of aluminum chelate was added. The mixture was gelled at 160° C. for 1 hour to form a varnish.

TABLE 2

|  | Example | | | | Comparative Example | |
|---|---|---|---|---|---|---|
|  | 1 | 2 | 3 | 4 | 1 | 2 |
| Resin (parts) | 50 | 56 | 48 | 56 | 45 | 45 |
| Linseed oil (parts) | 20 | 14 | 22 | 14 | 25 | 25 |
| Solvent (parts) | 30 | | | | 30 | |
| Aluminum chelate (parts) | 1 | | | | 1 | |
| Total oil content (%) | 25 | | | | 25 | |

Preparation of an ink

Using three roll mill, the following ingredients were kneaded to form an ink.

"Carmine 6B" (pigment)—20 parts
Varnish—65 parts
Wax—5 parts
No. 5 solvent—required amount The amount of No. 5 solvent was the one required to adjust the tack value of the ink to 11–12 and the flow value of the ink to 31–33.

Storage stability of the ink

The ink was stored for 1 week in a closed vessel at room temperature. The difference of the flow value after storage for one week from that immediately after the ink preparation was determined and used as a measure for the stability of the ink.

Gloss

The ink (0.4 ml) was spread on art paper by an RI tester, and maintained for 24 hours at 20° C. and 65% RH. The gloss of the ink on the art paper was measured by a 60°-60° glossmeter.

Set

The ink (0.4 ml) was spread on art paper by an RI tester, and then superimposed on art paper using an RI tester roller. The degree of ink adhesion was observed, and the time (minutes) which elapsed until the ink no longer adhered to the art paper was measured.

What we claim is:

1. A process for producing an animal or vegetable oil-modified and rosin-modified phenolic resin for printing inks, which comprises:
    (I) reacting (a) a resol phenol/formaldehyde initial condensation product, (b) an animal or vegetable oil having an iodine value of 100 to 210 or containing a hydroxyl group, (c) a rosin and (d) an alcohol; or
    (II) reacting the condensation product (a) and the animal or vegetable oil (b) with a rosin ester obtained by the reaction of the rosin (c) and the alcohol (d).

2. The process of claim 1 wherein the animal or vegetable oil-modified and rosin-modified phenolic resin has an acid value of not more than 30 and a softening point of at least 70° C.

3. The process of claim 2 wherein the animal or vegetable-modified and rosin-modified phenolic resin has a softening point of from 100° to 150° C.

4. The process of claim 1 wherein the resol phenol/formaldehyde initial condensation product (a) is a product obtained by reacting a phenol selected from the group consisting of phenol, cresol, p-tert-butylphenol, p-octylphenol, p-nonylphenol and bisphenol A with a formaldehyde-yielding substance selected from the group consisting of formalin and paraformaldehyde in the presence of an alkaline catalyst, and neutralizing the reaction product with an acid.

5. The process of claim 1 wherein the resol phenol/formaldehyde initial condensation product is a mixture of a compound of the formula (A)

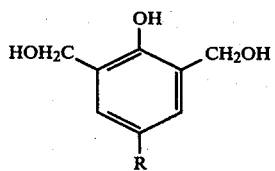

[A]

wherein R represents a hydrogen atom or an alkyl group, as the main component, and at least one compound selected from compounds of the formula (B) and (C);

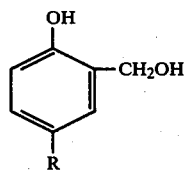

(B)

wherein
R is as defined above,

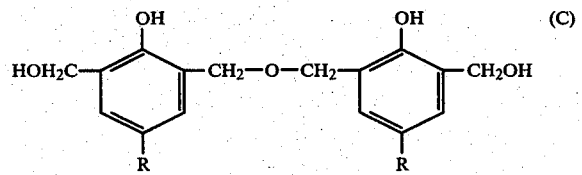

(C)

wherein
R is as defined above.

6. The process of claim 1 wherein the animal or vegetable oil (b) is at least one member selected from the group consisting of tall oil, cotton seed oil, soybean oil, safflower oil, dehydrated castor oil, linseed oil, tung oil, cattlefish oil, sardine oil, castor oil and stand oil or the fatty acids thereof.

7. The process of claim 1 wherein from 10 to 35 parts by weight of the resol phenol/formaldehyde initial condensation production (a) per 100 parts by weight of the entire resin-forming components and from 5 to 40 parts by weight of the animal or vegetable oil (b), per 100 parts by weight of the entire resin-forming components are reacted to form the reaction product (I) or (II).

8. The process of claim 1 wherein said rosin (c) is selected from the group consisting of gum rosin, wood rosin, tall oil rosin and hardened rosin and the alcohol (d) is selected from the group consisting of ethylene glycol, diethylene glycol, propylene glycol, dipropylene glycol, butylene glycol, neopentyl glycol, hexanediol, hexanetriol, glycerol, trimethylolethane, trimethylolpropane, pentaerythritol, hexyl alcohol, nonyl alcohol and octyl alcohol.

9. The process of claim 1 or 10 wherein said oil-modified and rosin-modified phenolic resin is prepared by adding the initial condensation product (a) dropwise continuously or intermittently at a temperature of 120° to 180° C. for a period of from 1 to 5 hours to a mixture of the rosin (c) and animal or vegetable oil (b) and esterifying the resulting reaction product with the alcohol (d) at 200° to 280° C.

10. A process for producing an animal or vegetable oil-modified and rosin-modified phenolic resin useful in preparing varnishes for printing inks having both high gloss and fast set which comprises reacting
    (a) a resol phenol/formaldehyde initial condensation product comprised predominantly of a compound of the formula (a)

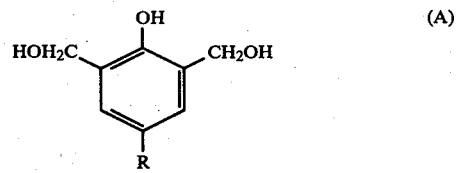

(A)

wherein R represents a hydrogen atom or an alkyl group,
    (b) at least one animal or vegetable oil having an iodine value of 100 to 210 or containing an hydroxyl group;
    (c) a rosin, and
    (d) a trihydric aliphatic alcohol or higher aliphatic monohydric alcohol; and,
        up to not more than 30 parts by weight per 100 parts by weight of the total resin-forming components of an aliphatic, aromatic or alicyclic resin having a number average molecular weight of about 500 to 5,000 and a softening point of at least 70° C.;

the amounts of (a) and (b) being, respectively, from about 10 to about 35 parts, and about 5 to about 45 parts, each based on 100 parts by weight of the resin-forming components; and the amount of the alcohol (d) providing an equivalent ratio of hydroxyl groups to the total carboxylic acid of from 0.7:1 to 1.3:1;

said oil-modified and rosin-modified phenolic resin having a softening point of 100° to 150° C. and an acid value of not more than 30 and a number average molecular weight of from about 500 to about 5,000 calculated in terms of polystyrene.

11. A process for producing an animal or vegetable oil-modified and rosin-modified phenolic resin useful in preparing varnishes for printing inks having both high gloss and fast set which comprises reacting (a) a resol phenol/formaldehyde initial condensation product comprised predominantly of a compound of the formula (A)

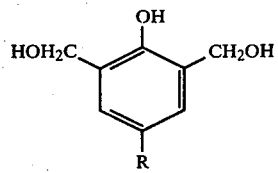

wherein R represents a hydrogen atom or an alkyl group,
(b) at least one animal or vegetable oil having an iodine value of 100 to 210 or containing an hydroxyl group;
(c) a rosin,
(d) a trihydric aliphatic alcohol or higher aliphatic monohydric alcohol,
and at least one of the following components (e) and (f):
(e) a monobasic or polybasic carboxylic acid,
(f) an aliphatic, aromatic or alicyclic resin having a number average molecular weight of about 500 to 5,000 and a softening point of at least 70° C., the amount of (f) being up to not more than 30 parts by weight per 100 parts by weight of the total resin-forming components;

the amounts of (a) and (b) being, respectively, from about 10 to about 35 parts, and about 5 to about 45 parts, each based on 100 parts by weight of the resin-forming components; and the amount of the alcohol (d) providing an equivalent ratio of hydroxyl groups to the total carboxylic acid of from 0.7:1 to 1.3:1;

said oil-modified and rosin-modified phenolic resin having a softening point of 100° to 150° C. and an acid value of not more than 30 and a number average molecular weight of from about 500 to about 5,000 calculated in terms of polystyrene.

12. The process of claim 11 wherein component (e) is present.

13. The process of claim 11 wherein component (f) is present.

14. A process for producing an animal or vegetable oil-modified and rosin-modified phenolic resin for printing inks, which comprises
(I) reacting (a) a resol phenol/formaldehyde initial condensation product, (b) an animal or vegetable oil having an iodine value of 100 to 210 or containing a hydroxyl group, (c) a rosin and (d) an alcohol; or
(II) reacting the condensation product (a) and the animal or vegetable oil (b) with a rosin ester formed by reacting the rosin (c) and the alcohol (d);

and further reacting the reaction product (I) or (II) with a carboxylic acid (e) or a hydrocarbon resin (f) selected from the group consisting of aliphatic, aromatic and alicyclic resins having a number average molecular weight of from about 500 to about 5,000 and a softening point of at least 70° C.

15. The process of claim 14 wherein the reaction product (I) is reacted with the carboxylic acid (e).

16. The process of claim 14 wherein the reaction product (I) is further reacted with the hydrocarbon resin (f).

17. The process of claim 14 wherein the reaction product (II) is further reacted with the carboxylic acid (e).

18. The process of claim 14 wherein the reaction product (II) is further reacted with the hydrocarbon resin (f).

* * * * *